(12) United States Patent
Kim et al.

(10) Patent No.: US 12,099,675 B2
(45) Date of Patent: Sep. 24, 2024

(54) ELECTRONIC DEVICE HAVING SENSOR LAYER GENERATING UPLINK SIGNALS

(71) Applicant: Samsung Display Co., LTD., Yongin-si (KR)

(72) Inventors: Junghak Kim, Hwaseong-si (KR); Youngsik Kim, Yongin-si (KR); Kyowon Ku, Seoul (KR); Jeongheon Lee, Yongin-si (KR); Hansu Cho, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 3 days.

(21) Appl. No.: 18/072,510

(22) Filed: Nov. 30, 2022

(65) Prior Publication Data

US 2023/0185398 A1 Jun. 15, 2023

(30) Foreign Application Priority Data

Dec. 14, 2021 (KR) ........................ 10-2021-0178927

(51) Int. Cl.
| | |
|---|---|
| *G06F 3/041* | (2006.01) |
| *G06F 3/0354* | (2013.01) |
| *G06F 3/044* | (2006.01) |
| *G09G 3/32* | (2016.01) |

(52) U.S. Cl.
CPC .......... *G06F 3/04162* (2019.05); *G09G 3/32* (2013.01); *G06F 3/03545* (2013.01); *G06F 3/0412* (2013.01); *G06F 3/0443* (2019.05); *G06F 2203/04106* (2013.01); *G09G 2330/028* (2013.01); *G09G 2354/00* (2013.01)

(58) Field of Classification Search
CPC ... G06F 3/03545; G06F 3/04162–0441; G06F 3/044; G06F 3/0443; G06F 1/1643; G06F 3/0412; G06F 2203/04106; G06F 3/0446; G06F 3/0416; G09G 2330/028; G09G 2354/00; G09G 3/32
See application file for complete search history.

(56) References Cited

U.S. PATENT DOCUMENTS

| | | |
|---|---|---|
| 6,043,810 A | 3/2000 | Kim et al. |
| 10,241,597 B2 | 3/2019 | Jung et al. |
| 2012/0081320 A1* | 4/2012 | Hwang ................. G06F 3/0445 345/173 |
| 2017/0010739 A1* | 1/2017 | Ito ......................... G06F 3/0446 |
| 2020/0004367 A1* | 1/2020 | Lee ...................... G06F 3/03545 |
| 2021/0072876 A1* | 3/2021 | Nomura ................ G06F 1/3215 |
| 2022/0083193 A1* | 3/2022 | Kang .................... G09G 3/006 |

FOREIGN PATENT DOCUMENTS

| KR | 10-1998-0702634 A | 8/1998 |
|---|---|---|
| KR | 10-2017-0090968 A | 8/2017 |

* cited by examiner

*Primary Examiner* — Temesghen Ghebretinsae
*Assistant Examiner* — Ivelisse Martinez Quiles
(74) *Attorney, Agent, or Firm* — Lewis Roca Rothgerber Christie LLP

(57) ABSTRACT

An electronic device includes: a display layer configured to display an image; a display driver configured to drive the display layer; a sensor layer on the display layer; and a sensor driver configured to drive the sensor layer, and wherein the sensor layer is configured to output a first uplink signal generated with a first reference voltage in a first mode, and to output a second uplink signal generated with a second reference voltage greater than the first reference voltage in a second mode different from the first mode.

18 Claims, 11 Drawing Sheets

ELECTRONIC DEVICE HAVING SENSOR LAYER GENERATING UPLINK SIGNALS

CROSS-REFERENCE TO RELATED APPLICATION

The present application claims priority to and the benefit of Korean Patent Application No. 10-2021-0178927 filed on Dec. 14, 2021, in the Korean Intellectual Property Office, the entire disclosure of which is incorporated herein by reference.

BACKGROUND

Aspects of some embodiments of the present disclosure described herein relate to an electronic device capable of detecting an active input.

Multimedia electronic devices such as a television, a mobile phone, a tablet computer, a navigation system, a game console, and the like include a display device for displaying images. In addition to a general input method such as a button, a keyboard, a mouse, or the like, an electronic device may include a sensor layer (or an input sensor) capable of providing a touch-based input method that allows a user to enter information or commands relatively easily and intuitively using a touch input (e.g., with a finger, a stylus, and the like).

The input sensor may detect touch or pressure from the user's body (e.g., the user's finger). In the meantime, there is an increasing demand for employing a pen or stylus for a fine touch input for a user who is accustomed to entering information by using writing instruments or for a specific application (e.g., an application for sketching or drawing).

The above information disclosed in this Background section is only for enhancement of understanding of the background and therefore the information discussed in this Background section does not necessarily constitute prior art.

SUMMARY

Aspects of some embodiments of the present disclosure include an electronic device capable of detecting an active input in various environments.

According to some embodiments of the present disclosure, an electronic device includes a display layer that displays an image, a display driver that drives the display layer, a sensor layer on the display layer, and a sensor driver that drives the sensor layer, and the sensor layer outputs a first uplink signal generated with a first reference voltage in a first mode, and outputs a second uplink signal generated with a second reference voltage greater than the first reference voltage in a second mode different from the first mode.

According to some embodiments, the first reference voltage may be a voltage provided inside the sensor driver, and the second reference voltage may be a voltage provided from an outside of the sensor driver.

According to some embodiments, the electronic device may further include a power supply circuit that generates a plurality of driving voltages necessary for driving the display layer, the sensor layer, the display driver, and the sensor driver, and the second reference voltage may be one of the plurality of driving voltages.

According to some embodiments, the driving voltages may include a gate high voltage and a gate low voltage, and the second reference voltage may be the gate high voltage.

According to some embodiments, the first reference voltage may be a voltage provided by boosting a power supply voltage to a level (e.g., a set or predetermined level), and the second reference voltage may be a voltage provided by boosting the power supply voltage to a level greater than the level (e.g., the set or predetermined level).

According to some embodiments, the sensor driver may further include a charge pump, and, in the first mode, the charge pump may provide the first reference voltage boosted by a power supply voltage.

According to some embodiments, the sensor driver may further include a DC/DC converter that provides the second reference voltage boosted by the power supply voltage.

According to some embodiments, the sensor driver may include a signal generation circuit that provides the first uplink signal or the second uplink signal to the sensor layer, an input detection circuit that receives a sensing signal from the sensor layer, and a sensor control circuit that controls operations of the signal generation circuit and the input detection circuit, and the signal generation circuit may receive the first reference voltage from the sensor control circuit and may receive the second reference voltage from an outside of the sensor driver.

According to some embodiments, the electronic device may further include a first switch connected between a node to which the first reference voltage is provided and the signal generation circuit, and a second switch connected between a terminal to which the second reference voltage is provided and the signal generation circuit, and, in the first mode, the first switch may be turned on, and the second switch may be turned off, and, in the second mode, the first switch may be turned off, and the second switch may be turned on.

According to some embodiments, the electronic device may further include a main driver that controls operations of the display driver and the sensor driver, and the main driver may output a switch control signal for controlling an operation of the first switch and an operation of the second switch.

According to some embodiments of the present disclosure, an electronic device includes a display layer that displays an image, a sensor layer on the display layer, and a sensor driver electrically connected to the sensor layer and that is selectively driven in a first input mode for detecting a passive input or a second input mode for detecting an active input, and, in the second input mode, the sensor layer selectively outputs a first uplink signal generated with a first reference voltage or a second uplink signal generated with a second reference voltage greater than the first reference voltage.

According to some embodiments, the first reference voltage may be a voltage provided inside the sensor driver, and the second reference voltage may be a voltage provided from an outside of the sensor driver.

According to some embodiments, the electronic device may further include a power supply circuit that generates a plurality of driving voltages for driving the display layer and the sensor layer, and the second reference voltage may be one of the plurality of driving voltages.

According to some embodiments, the first reference voltage may be a voltage provided by boosting a power supply voltage to a level (e.g., a set or predetermined level), and the second reference voltage may be a voltage provided by boosting the power supply voltage to a level greater than the level (e.g., the set or predetermined level).

According to some embodiments, the electronic device may further include a DC/DC converter that provides the second reference voltage.

According to some embodiments of the present disclosure, an electronic device includes a display layer that displays an image, a display driver that drives the display layer, a sensor layer on the display layer, and a sensor driver that drives the sensor layer, and the sensor driver includes a signal generation circuit that selectively uses a first reference voltage or a second reference voltage different from the first reference voltage to generate an uplink signal, and provides the uplink signal to the sensor layer, an input detection circuit that receives a sensing signal from the sensor layer, and a sensor control circuit that controls operations of the signal generation circuit and the input detection circuit, and the signal generation circuit receives the first reference voltage from the sensor control circuit and receives the second reference voltage from an outside of the sensor driver.

According to some embodiments, the electronic device may further include a power supply circuit that generates a plurality of driving voltages for driving the display layer and the sensor layer, and the driving voltages may include a gate high voltage and a gate low voltage, and the second reference voltage may be the gate high voltage.

According to some embodiments, the first reference voltage may be a voltage provided by boosting a power supply voltage to a level (e.g., a set or predetermined level), and the second reference voltage may be a voltage provided by boosting the power supply voltage to a level greater than the level (e.g., the set or predetermined level).

According to some embodiments, the electronic device may further include a DC/DC converter that provides the second reference voltage.

According to some embodiments, the electronic device may further include a first switch connected between a node to which the first reference voltage is provided and the signal generation circuit, a second switch connected between a terminal to which the second reference voltage is provided and the signal generation circuit, and a main driver that provides a switch control signal for controlling an operation of the first switch and an operation of the second switch.

BRIEF DESCRIPTION OF THE FIGURES

The above and other characteristics and features of embodiments according to the present disclosure will become more apparent by describing in more detail aspects of some embodiments thereof with reference to the accompanying drawings.

DETAILED DESCRIPTION

Figure 1:
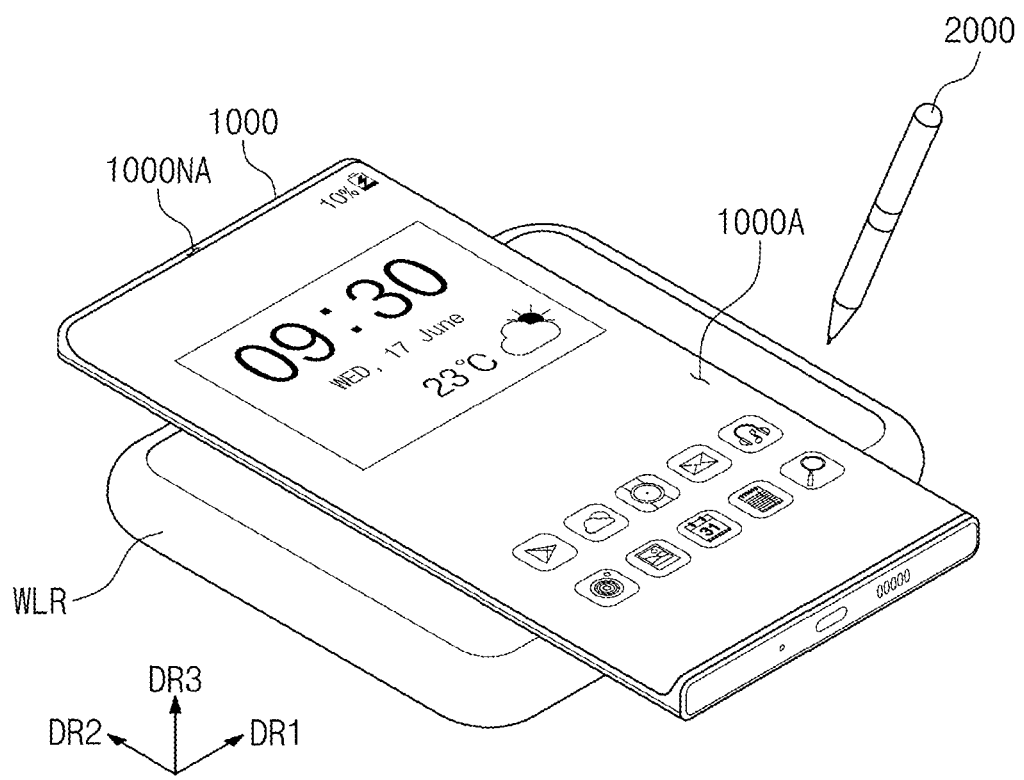
FIG. 1 is a perspective view illustrating a use state of an electronic device, according to some embodiments of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Also, the terms "under", "beneath", "on", "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

The terms "part" and "unit" mean a software component or a hardware component that performs a specific function. The hardware component may include, for example, a field-programmable gate array (FPGA) or an application-specific integrated circuit (ASIC). The software component may refer to executable code and/or data used by executable code in an addressable storage medium. Thus, software components may be, for example, object-oriented software components, class components, and working components, and may include processes, functions, properties, procedures, subroutines, program code segments, drivers, firmwares, micro-codes, circuits, data, databases, data structures, tables, arrays or variables.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the present disclosure.

Hereinafter, aspects of some embodiments of the present disclosure will be described in more detail with reference to accompanying drawings.

FIG. 1 is a perspective view illustrating a use state of an electronic device 1000, according to some embodiments of the present disclosure.

Referring to FIG. 1, the electronic device 1000 may be activated, in response to electrical signals. For example, the electronic device 1000 may be a cellular phone, a tablet, a car navigation system, a game console, or a wearable device, but embodiments according to the present disclosure are not limited thereto. FIG. 1 illustrates that the electronic device 1000 is a cellular phone.

An active area 1000A and a peripheral area 1000NA may be defined in the electronic device 1000. The electronic device 1000 may display an image through the active area 1000A. The active area 1000A may include a surface defined by a first direction DR1 and a second direction DR2. The peripheral area 1000NA may surround the active area 1000A.

The thickness direction of the electronic device 1000 may be parallel to a third direction DR3 crossing the first direction DR1 and the second direction DR2. Accordingly, front surfaces (or top surfaces) and rear surfaces (or bottom surfaces) of members constituting the electronic device 1000 may be defined based on the third direction DR3.

The electronic device 1000 may detect inputs applied from the outside. For example, the electronic device 1000 may detect both an active input by an input device 2000 and a passive input by a touch 3000 (refer to FIG. 3). The input device 2000 is an active type input mechanism or device that provides a driving signal, and may be, for example, an active pen. The touch 3000 (refer to FIG. 3) may include all input mechanisms capable of providing a change in capacitance, such as a user's body and a passive pen.

The electronic device 1000 may be placed on a wireless charging pad WLP to be wirelessly charged. Wireless power may be transferred by an electromagnetic resonance method or an electromagnetic induction method, but embodiments according to the present disclosure are not particularly limited thereto. The electronic device 1000 and the input device 2000 may bi-directionally communicate with each other. In this case, a signal generated during wireless charging may affect communication between the electronic device 1000 and the input device 2000 as a noise component. According to some embodiments of the present disclosure, the electronic device 1000 may generate an uplink signal having a reference voltage through which communication with the input device 2000 is smooth even in a noise environment. This will be more fully detailed later.

Figure 2:
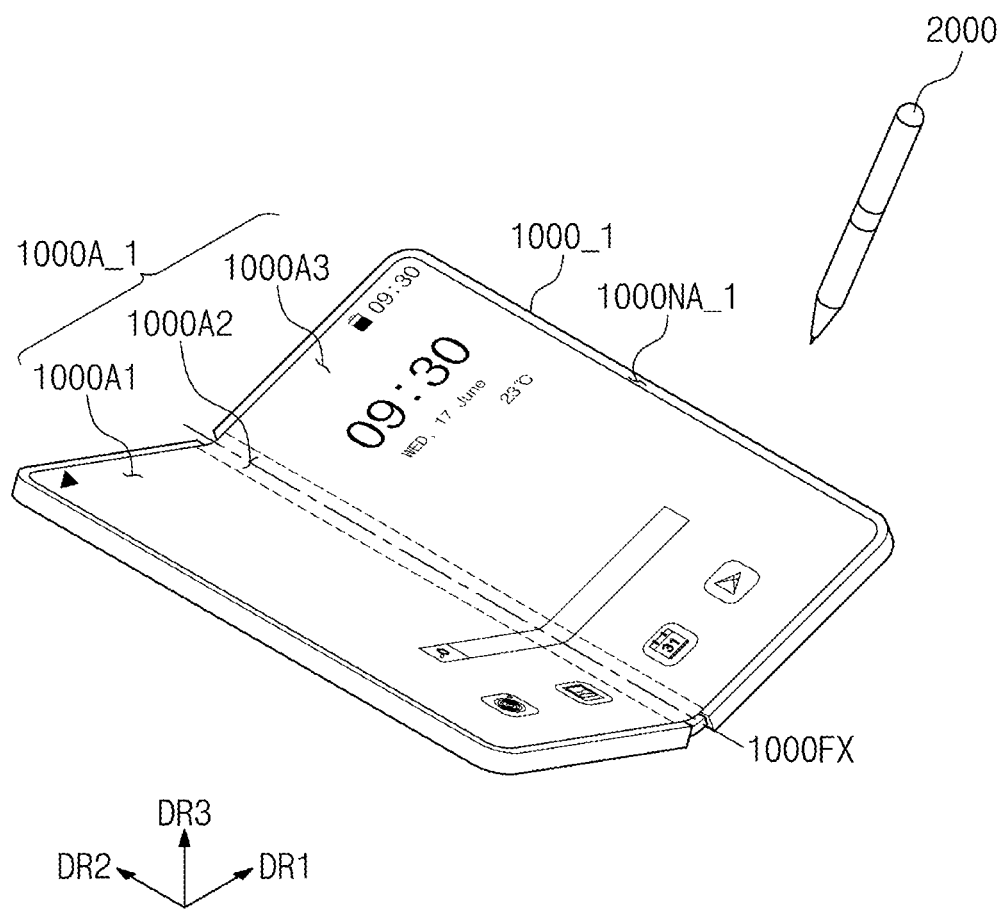
FIG. 2 is a perspective view illustrating a use state of an electronic device, according to some embodiments of the present disclosure.

FIG. 2 is a perspective view illustrating a use state of an electronic device 1000_1, according to some embodiments of the present disclosure.

Referring to FIG. 2, the electronic device 1000_1 may display images at an active area 1000A_1. FIG. 2 illustrates a state in which the electronic device 1000_1 is folded at an angle (e.g., a set or predetermined angle). The active area 1000A_1 may include (or may be parallel to) a plane defined by the first direction DR1 and the second direction DR2, in a state where the electronic device 1000_1 is unfolded.

The active area 1000A_1 may include a first area 1000A1, a second area 1000A2, and a third area 1000A3. The first area 1000A1, the second area 1000A2, and the third area 1000A3 may be sequentially defined in the first direction DR1. The second area 1000A2 may be bent based on a folding axis 1000FX extending in the second direction DR2. Accordingly, the first area 1000A1 and the third area 1000A3 may be referred to as non-folding areas, and the second area 1000A2 may be referred to as a folding area.

When the electronic device 1000_1 is folded, the first area 1000A1 and the second area 1000A2 may face each other. Accordingly, in a state where the electronic device 10001 is fully folded, the active area 1000A_1 may not be exposed to the outside, which may be referred to as "in-folding". However, it is an example, and the operation of the electronic device 1000_1 is not limited thereto.

For example, according to some embodiments of the present disclosure, when the electronic device 1000_1 is folded, the first area 1000A1 and the second area 1000A2 may be opposite to each other. Accordingly, in a state where the electronic device 1000_1 is folded, the active area 1000A_1 may be exposed to the outside, which may be referred to as "out-folding".

The electronic device 1000_1 may perform only one operation of an in-folding operation or an out-folding operation. Alternatively, the electronic device 10001 may perform both the in-folding operation and the out-folding operation. In this case, the same area of the electronic device 1000_1, for example, the second area 1000A2 may be folded inwardly and outwardly.

One folding area and two non-folding areas are illustrated in FIG. 2A, but the number of folding areas and the number of non-folding areas are not limited thereto. For example, the electronic device 10001 may include a plurality of non-folding areas, of which the number is greater than two, and a plurality of folding areas interposed between non-folding areas adjacent to one another.

In FIG. 2, it is illustrated that the folding axis 1000FX extends in the second direction DR2, but embodiments according to the present disclosure are not limited thereto. For example, the folding axis 1000FX may extend in a direction parallel to the first direction DR1. In this case, the first area 1000A1, the second area 1000A2, and the third area 1000A3 may be sequentially arranged in the second direction DR2.

As previously described with reference to FIG. 1, the electronic device 1000_1 of FIG. 2 may also be positioned on the wireless charging pad WLP (refer to FIG. 1) to be wirelessly charged. According to some embodiments of the present disclosure, the electronic device 1000_1 may generate an uplink signal having a reference voltage through which communication with the input device 2000 is smooth even in a noise environment. Accordingly, the electronic device 1000_1 and the input device 2000 may bi-directionally communicate with each other even in a noise environment, for example, in a wireless charging environment. This will be more fully detailed later.

Figure 3:
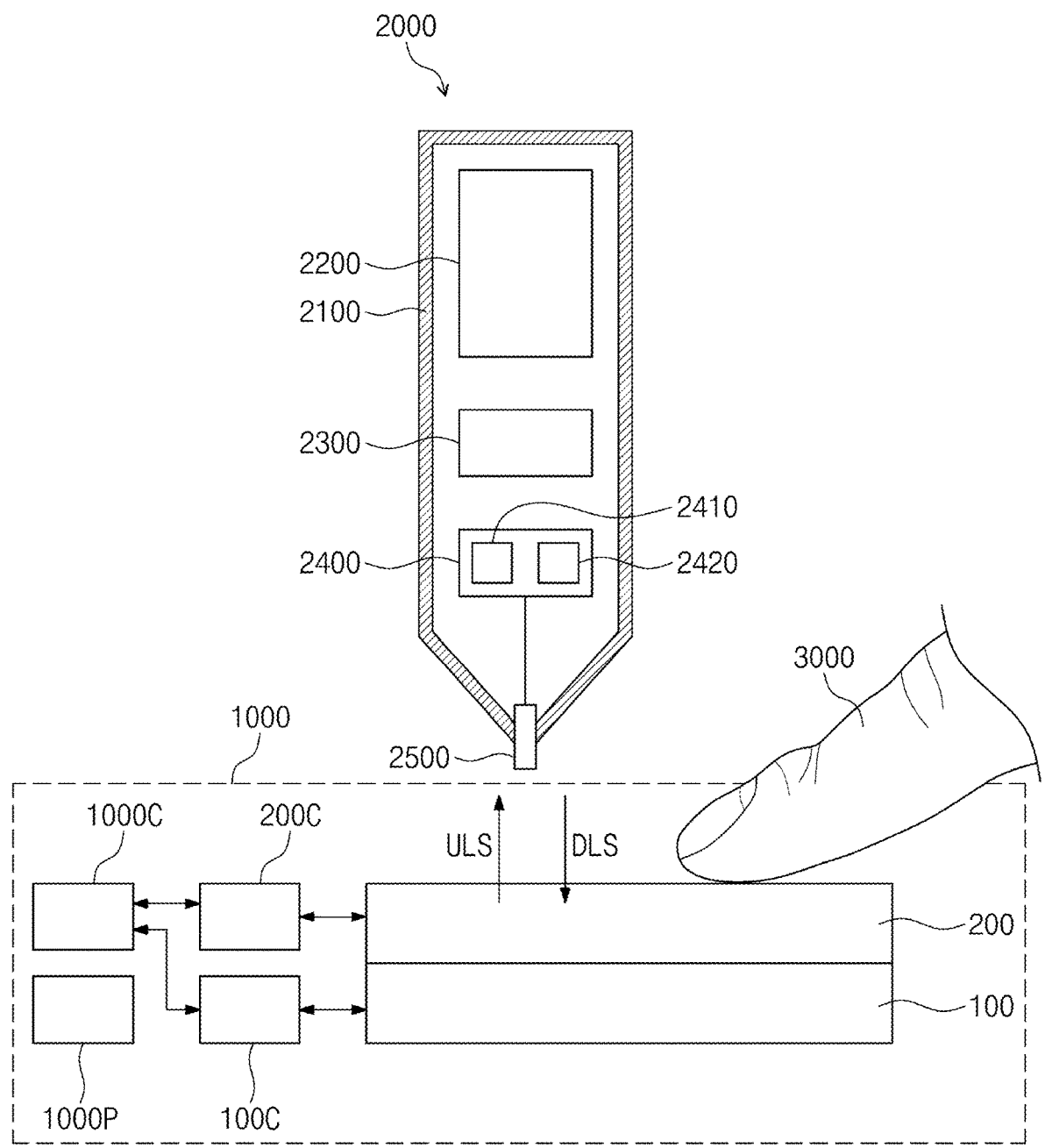
FIG. 3 is a block diagram schematically illustrating an electronic device and an input device, according to some embodiments of the present disclosure.

FIG. 3 is a block diagram schematically illustrating the electronic device 1000 and the input device 2000, according to some embodiments of the present disclosure.

Referring to FIG. 3, the electronic device 1000 may include a display layer 100, a sensor layer 200, a display driver 100C, a sensor driver 2000, a main driver 1000C, and a power supply circuit 1000P.

The display layer 100 may be a component which actually generates an image. The display layer 100 may be a light emitting display layer. For example, the display layer 100 may be an organic light emitting display layer, an inorganic light emitting display layer, an organic-inorganic display layer, a quantum dot display layer, a micro-LED display layer, or a nano-LED display layer.

The sensor layer 200 may be located on the display layer 100. The sensor layer 200 may detect an external input applied to the sensor layer 200 from an outside. The sensor layer 200 may be an integrated sensor continuously formed during the manufacturing process of the display layer 100, or the sensor layer 200 may be an external sensor attached to the display layer 100.

The main driver 1000C may control the overall operation of the electronic device 1000. For example, the main driver 1000C may control operations of the display driver 100C and the sensor driver 2000. The main driver 1000C may include at least one microprocessor, and the main driver 1000C may be referred to as a host. The main driver 1000C may further include a graphics controller.

The display driver 100C may drive the display layer 100. The display driver 100C may receive image data and a control signal from the main driver 1000C. The control signal may include various signals. For example, the control signal may include an input vertical synchronization signal, an input horizontal synchronization signal, a main clock, and a data enable signal.

The sensor driver 2000 may drive the sensor layer 200. The sensor driver 2000 may receive a control signal from the main driver 1000C. The control signal may include a mode determination signal for determining a driving mode of the sensor driver 2000 or a clock signal. The sensor driver 2000 may be selectively driven in a first input mode for detecting a passive input or a second input mode for detecting an active input based on a control signal.

The power supply circuit 1000P may include a power management integrated circuit (PMIC). The power supply circuit 1000P may generate a plurality of driving voltages for driving the display layer 100, the sensor layer 200, the display driver 100C, and the sensor driver 2000. For example, the plurality of driving voltages may include a gate high voltage, a gate low voltage, an ELVSS voltage, an ELVDD voltage, an initialization voltage, etc., but embodiments according to the present disclosure are not particularly limited to the above example.

The electronic device 1000 and the input device 2000 may bi-directionally communicate with each other. The electronic device 1000 may provide an uplink signal ULS to the input device 2000. For example, the uplink signal ULS may include a synchronization signal or information of the electronic device 1000, but is not particularly limited thereto. The input device 2000 may provide a downlink signal DLS to the electronic device 1000. The downlink signal DLS may include a synchronization signal or state information of the input device 2000. For example, the downlink signal DLS may include coordinate information of the input device 2000, battery information of the input device 2000, tilt information of the input device, and/or various information stored in the input device 2000. However, it is not particularly limited thereto.

The input device 2000 may include a housing 2100, a power source 2200, a controller 2300, a communication module 2400, and a pen tip 2500. However, components constituting the input device 2000 are not limited to the components listed above. For example, the input device 2000 may further include an electrode switch for switching to a signal transmission mode or a signal reception mode, a pressure sensor for detecting pressure, a memory for storing information (e.g., set or predetermined information), or a rotation sensor for detecting rotation.

The housing 2100 may have a pen shape, and an accommodation space may be formed therein. The power source 2200, the controller 2300, the communication module 2400, and the pen tip 2500 may be accommodated in the accommodation space defined inside the housing 2100.

The power source 2200 may supply power to the controller 2300 and the communication module 2400 inside the input device 2000. The power source 2200 may include a battery or a high capacity capacitor.

The controller 2300 may control an operation of the input device 2000. The controller 2300 may be an application-specific integrated circuit (ASIC). The controller 2300 may be configured to operate according to a designed program.

The communication module 2400 may include a transmission circuit 2410 and a reception circuit 2420. The transmission circuit 2410 may output the downlink signal DLS to the sensor layer 200. The reception circuit 2420 may receive the uplink signal ULS provided from the sensor layer 200. The transmission circuit 2410 may receive the signal provided from the controller 2300 and may modulate it into a signal that may be sensed by the sensor layer 200, and the reception circuit 2420 may modulate the signal provided from the sensor layer 200 into a signal that may be processed by the controller 2300.

The pen tip 2500 may be electrically connected with the communication module 2400. A portion of the pen tip 2500 may protrude from the housing 2100. Alternatively, the input device 2000 may further include a cover housing that covers the pen tip 2500 exposed from the housing 2100. Alternatively, the pen tip 2500 may be built into the housing 2100.

Figure 4:
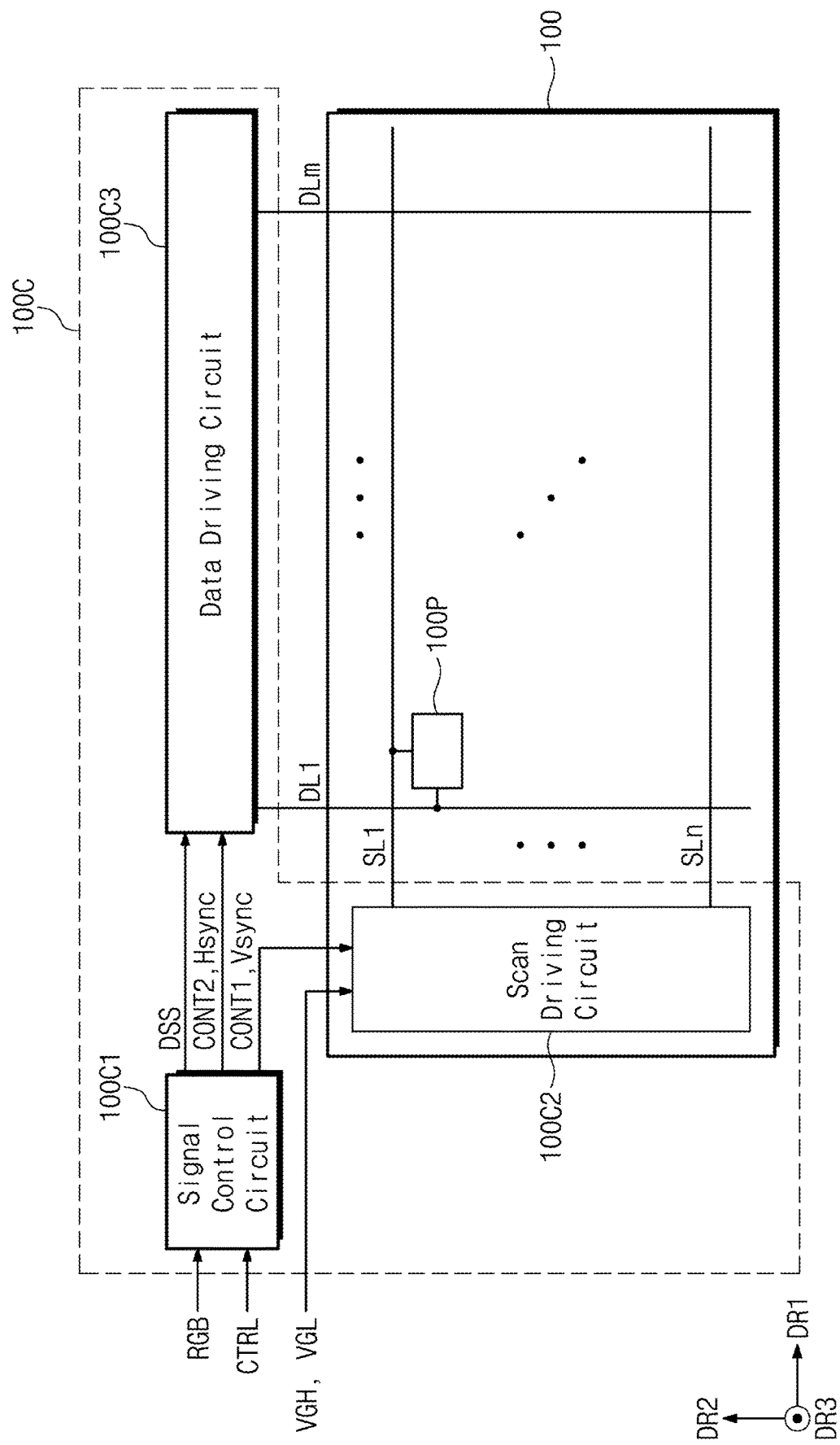
FIG. 4 is a block diagram illustrating a display layer and a display driver, according to some embodiments of the present disclosure.

FIG. 4 is a block diagram illustrating the display layer 100 and the display driver 100C, according to some embodiments of the present disclosure.

Referring to FIG. 4, the display layer 100 may include a plurality of scan lines SL1 to SLn, a plurality of data lines DL1 to DLm, and a plurality of pixels 100P. Each of the plurality of pixels 100P is connected with a corresponding data line of the plurality of data lines DL1 to DLm and is connected with a corresponding scan line of the plurality of scan lines SL1 to SLn. According to some embodiments of the present disclosure, the display layer 100 may further include light emission control lines, and the display driver 100C may further include a light emission driving circuit that provides control signals to the light emission control lines. The configuration of the display layer 100 is not particularly limited.

Each of the plurality of scan lines SL1 to SLn may extend in the first direction DR1, and the plurality of scan lines SL1 to SLn may be arranged to be spaced from each other in the second direction DR2. Each of the plurality of data lines DL1 to DLm may extend in the second direction DR2, and the plurality of data lines DL1 to DLm may be arranged to be spaced from each other in the first direction DR1.

The display driver 100C may include a signal control circuit 100C1, a scan driving circuit 100C2, and a data driving circuit 100C3.

The signal control circuit 100C1 may receive image data RGB and a control signal CTRL from the main driver 1000C (refer to FIG. 3). The control signal CTRL may include various signals. For example, the control signal CTRL may include an input vertical synchronization signal, an input horizontal synchronization signal, a main clock, and a data enable signal.

The signal control circuit 10001 may generate a first control signal CONT1 and a vertical synchronization signal Vsync, based on the control signal CTRL, and may output the first control signal CONT1 and the vertical synchronization signal Vsync to the scan driving circuit 10002.

The signal control circuit 10001 may generate a second control signal CONT2 and a horizontal synchronization signal Hsync, based on the control signal CTRL, and may output the second control signal CONT2 and the horizontal synchronization signal Hsync to the data driving circuit 10003. The horizontal synchronization signal Hsync may be included in the second control signal CONT2. In addition, the signal control circuit 10001 may output a data signal DSS, which is obtained by processing the image data RGB so as to comply with an operating condition of the display layer 100, to the data driving circuit 10003.

The scan driving circuit 10002 drives the plurality of scan lines SL1 to SLn in response to the first control signal CONT1 and the vertical synchronization signal Vsync. For example, the scan driving circuit 10002 may receive a gate high voltage VGH and a gate low voltage VGL from the power supply circuit 1000P (refer to FIG. 3). The scan driving circuit 10002 may provide a gate voltage to the plurality of scan lines SL1 to SLn. For example, the scan driving circuit 10002 may control activation of the plurality of scan lines SL1 to SLn by using the gate high voltage VGH and the gate low voltage VGL.

According to some embodiments of the present disclosure, the scan driving circuit 10002 may be formed in the same process as a circuit layer in the display layer 100, but is not limited thereto. For example, the scan driving circuit 10002 may be implemented as an integrated circuit (IC) and may be directly mounted on an area (e.g., a set or predetermined area) of the display layer 100 or on a separate printed circuit board in a chip-on-film (COF) manner to be electrically connected with the display layer 100.

The data driving circuit 10003 may output gray scale voltages for driving the plurality of data lines DL1 to DLm in response to the second control signal CONT2, the horizontal synchronization signal Hsync, and the data signal DSS from the signal control circuit 10001. The data driving circuit 10003 may be implemented as an integrated circuit and may be directly mounted on an area (e.g., a set or predetermined area) of the display layer 100 or on a separate printed circuit board in a chip-on-film manner to be electrically connected to the display layer 100, but is not particular limited thereto. For example, the data driving circuit 10003 may be formed in the same process as the circuit layer in the display layer 100.

Figure 5:
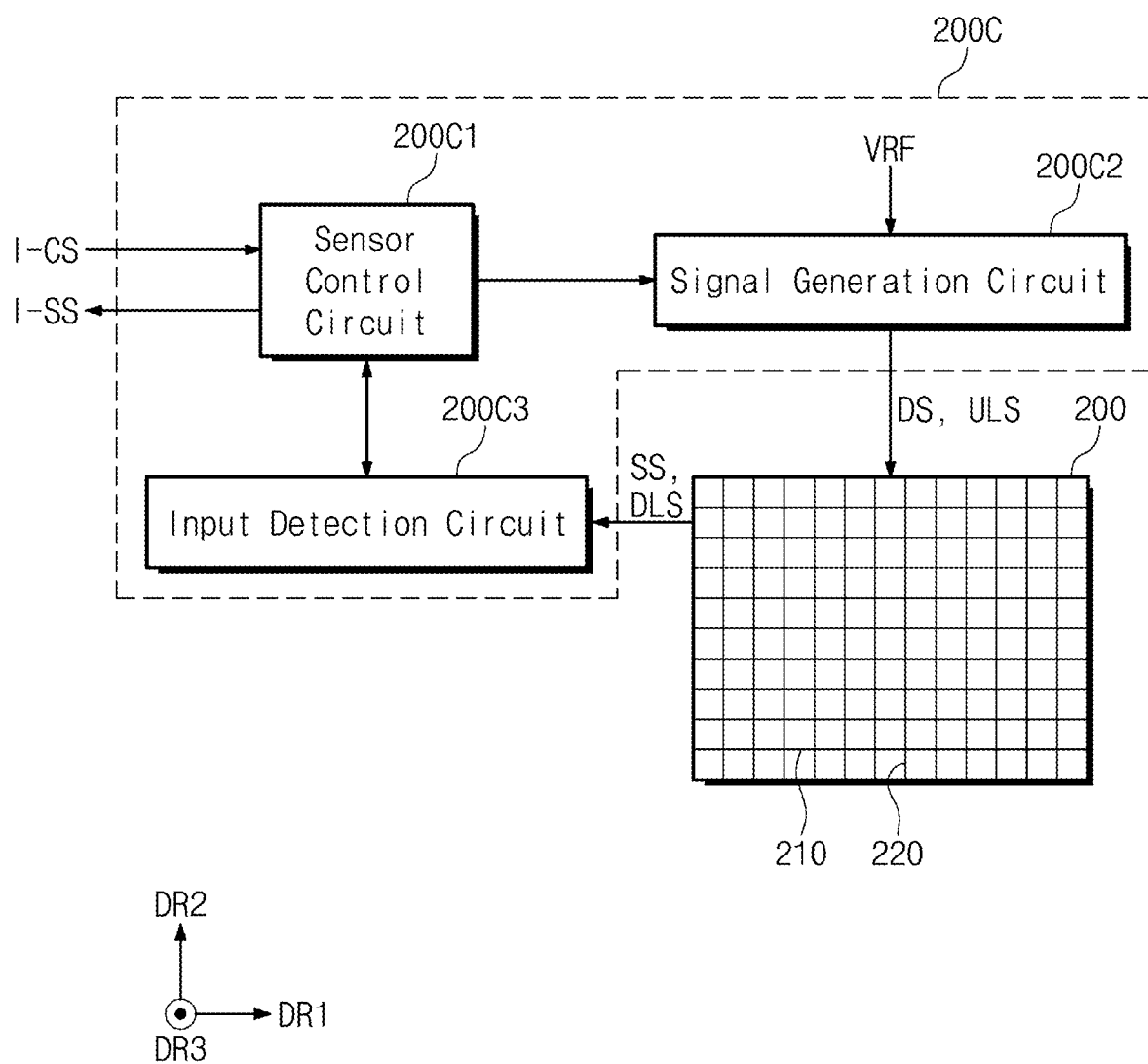
FIG. 5 is a block diagram illustrating a sensor layer and a sensor driver, according to some embodiments of the present disclosure.

FIG. 5 is a block diagram illustrating the sensor layer 200 and the sensor driver 2000, according to some embodiments of the present disclosure.

Referring to FIG. 5, the sensor layer 200 may include a plurality of electrodes 210 and a plurality of cross electrodes 220. The plurality of cross electrodes 220 may cross the plurality of electrodes 210. The plurality of electrodes 210 may be arranged in the second direction DR2, and each of the plurality of electrodes 210 may extend in the first direction DR1. The plurality of cross electrodes 220 may be arranged in the first direction DR1, and each of the plurality of cross electrodes 220 may extend in the second direction DR2. The sensor layer 200 may further include a plurality of signal lines connected to the plurality of electrodes 210 and the plurality of cross electrodes 220.

The sensor driver 2000 may receive a control signal I-CS from the main driver 1000C (refer to FIG. 3), and may provide a coordinate signal I-SS to the main driver 1000C (refer to FIG. 3). The sensor driver 2000 is implemented as an integrated circuit (IC) and is directly mounted on an area (e.g., a set or predetermined area) of the sensor layer 200 or on a separate printed circuit board in a chip-on-film (COF) manner to be electrically connected to the sensor layer 200.

The sensor driver 2000 may include a sensor control circuit 20001, a signal generation circuit 20002, and an input detection circuit 20003. The sensor control circuit 200C1, the signal generation circuit 200C2, and the input detection circuit 200C3 do not refer to physically separate and distinct components. For example, the sensor control circuit 200C1, the signal generation circuit 200C2, and the input detection circuit 200C3 are functionally divided according to their operations, and may be implemented in a single chip.

The sensor driver 2000 may be selectively driven in a first input mode for detecting a passive input or a second input mode for detecting an active input.

In the first input mode, the signal generation circuit 200C2 may sequentially output a driving signal DS to the sensor layer 200, for example, the cross electrodes 220. The input detection circuit 200C3 may receive sensing signals SS from the sensor layer 200. For example, the input detection circuit 200C3 may receive the sensing signals SS from the electrodes 210. According to some embodiments of the present disclosure, the signal generation circuit 200C2 may sequentially output the driving signal DS to the electrodes 210, and the input detection circuit 200C3 may receive the sensing signals SS from the cross electrodes 220.

In the second input mode, the signal generation circuit 200C2 may output the uplink signal ULS having a reference voltage VRF to the sensor layer 200. For example, the uplink signal ULS may be provided to the electrodes 210, the cross electrodes 220, or both the electrodes 210 and the cross electrodes 220. Thereafter, the input detection circuit 200C3 may receive the downlink signal DLS from the electrodes 210 and the cross electrodes 220.

The reference voltage VRF may be a first reference voltage or a second reference voltage higher than the first reference voltage. For example, the signal generation circuit 200C2 may output a first uplink signal generated as the first reference voltage in the first mode and may output a second uplink signal generated as the second reference voltage in the second mode. This will be more fully detailed later.

Figure 6A:
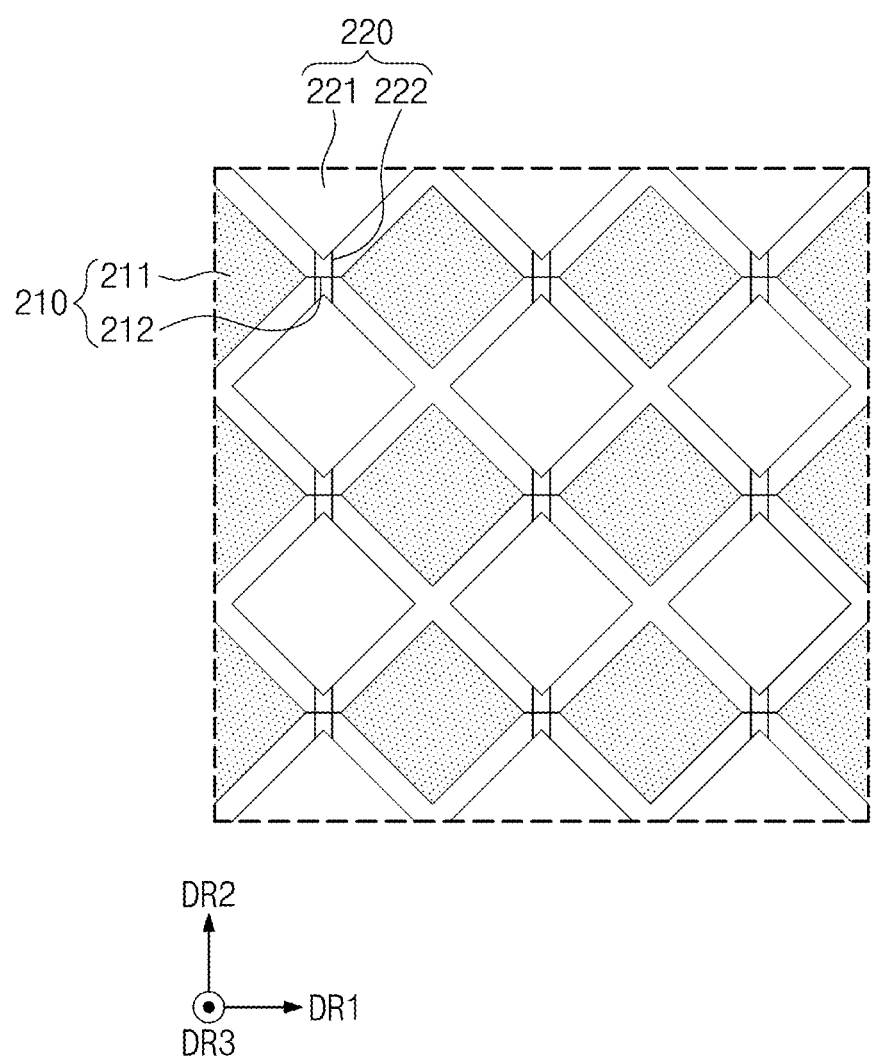
FIG. 6A is an enlarged plan view of a portion of a sensor layer, according to some embodiments of the present disclosure.

FIG. 6A is an enlarged plan view of a portion of the sensor layer 200, according to some embodiments of the present disclosure.

Referring to FIGS. 5 and 6A, the electrodes 210 may include first portions 211 and a second portion 212. The second portion 212 may be adjacent to the two first portions 211 adjacent to each other.

The cross electrodes 220 may include patterns 221 and connection patterns 222 (or bridge patterns). The connection patterns 222 may electrically connect adjacent two patterns 221 to each other. Although the adjacent two patterns 221 may be connected with each other by two connection patterns 222, the present disclosure is not limited thereto. The second portion 212 may be insulated from the two connection patterns 222 while crossing the two connection patterns 222.

The patterns 221, the first portions 211, and the second portions 212 may be located on the same layer, and the connection patterns 222 may be located in a layer different from the layer for the patterns 221, the first portions 211, and the second portions 212.

Figure 6B:
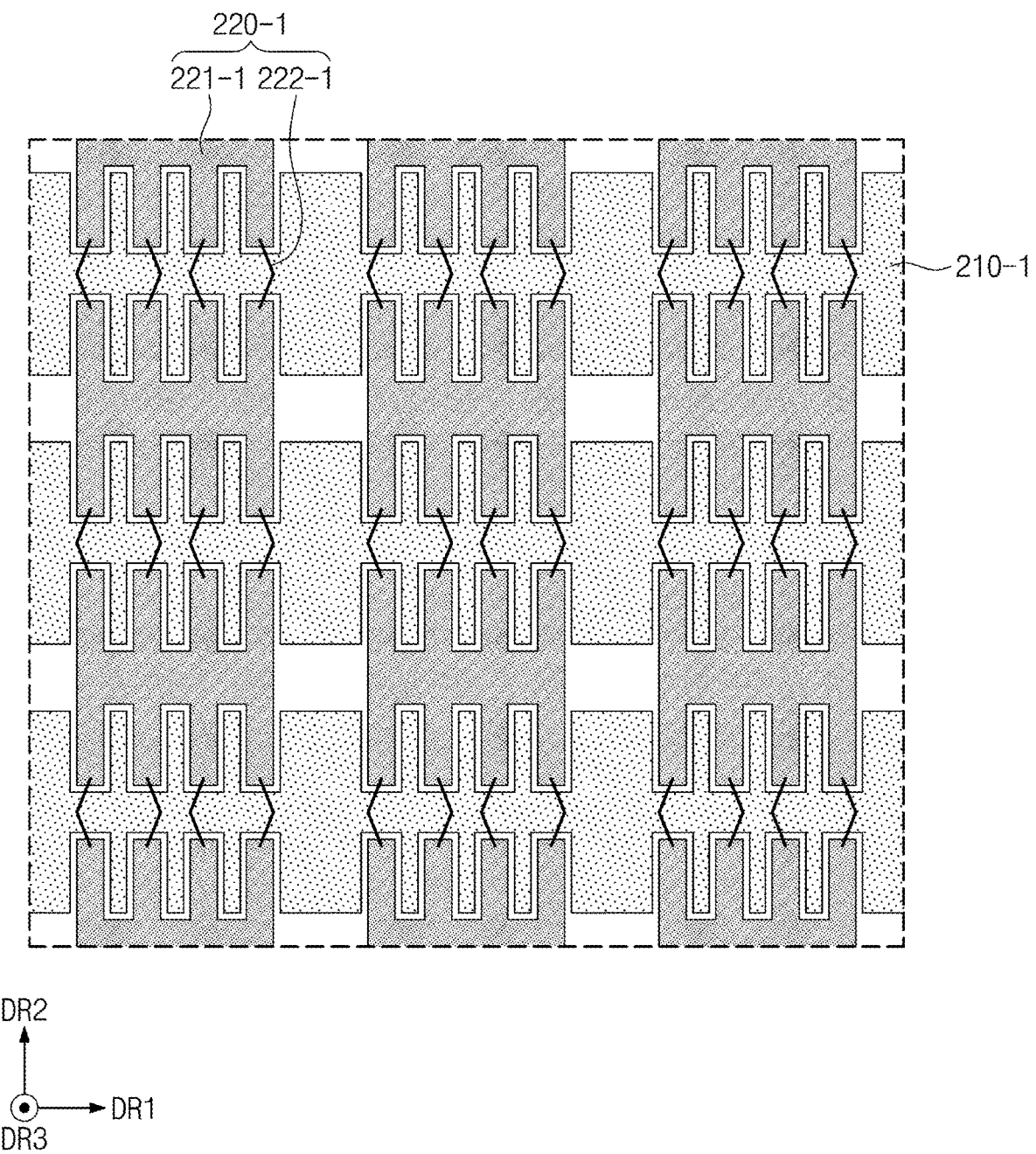
FIG. 6B is an enlarged plan view of a portion of a sensor layer, according to some embodiments of the present disclosure.

FIG. 6B is an enlarged plan view of a portion of the sensor layer 200, according to some embodiments of the present disclosure.

FIG. 6B illustrates electrodes 210-1 and cross electrodes 220-1 having different shapes from those of FIG. 6A, by way of example. The electrodes 210-1 and the cross electrodes 220-1 may have a bar shape.

Each of the electrodes 210-1 may extend in the first direction DR1, and the electrodes 210-1 may be arranged in the second direction DR2. The cross electrodes 220-1 may be arranged in the first direction DR1, and each of the cross electrodes 220-1 may extend in the second direction DR2. The cross electrodes 220-1 may include patterns 221-1 and connection patterns 222-1 (or bridge patterns). The connection patterns 222-1 may electrically connect adjacent two patterns 221-1 to each other. Although the adjacent two patterns 221-1 may be connected with each other by four connection patterns 222-1, embodiments according to the present disclosure are not limited thereto. One electrode 210-1 may be insulated from the four connection patterns 222-1 while crossing the four connection patterns 222-1. Although it is illustrated that the electrodes 210-1 have a shape engaging with the patterns 221-1, embodiments according to the present disclosure are not particularly limited thereto.

Each of the electrodes 210 or 210-1 and each of the cross electrodes 220 or 220-1 described with reference to FIGS. 6A and 6B may have a mesh structure. In this case, an opening may be defined in each of the electrodes 210 or 210-1 and the cross electrodes 220 or 220-1. However, embodiments according to the present disclosure are not limited thereto, and each of the electrodes 210 or 210-1 and the cross electrodes 220 or 220-1 may be a transparent electrode in which an opening is not defined.

In addition, the shape and arrangement structure of the electrodes 210 or 210-1 and the cross electrodes 220 or 220-1 described with reference to FIGS. 6A and 6B are only illustrated as an example, and the shape and arrangement structure of the electrodes 210 or 210-1 and the cross electrodes 220 or 220-1 constituting the sensor layer 200 are not limited to those illustrated in FIGS. 6A and 6B.

Figure 7A:
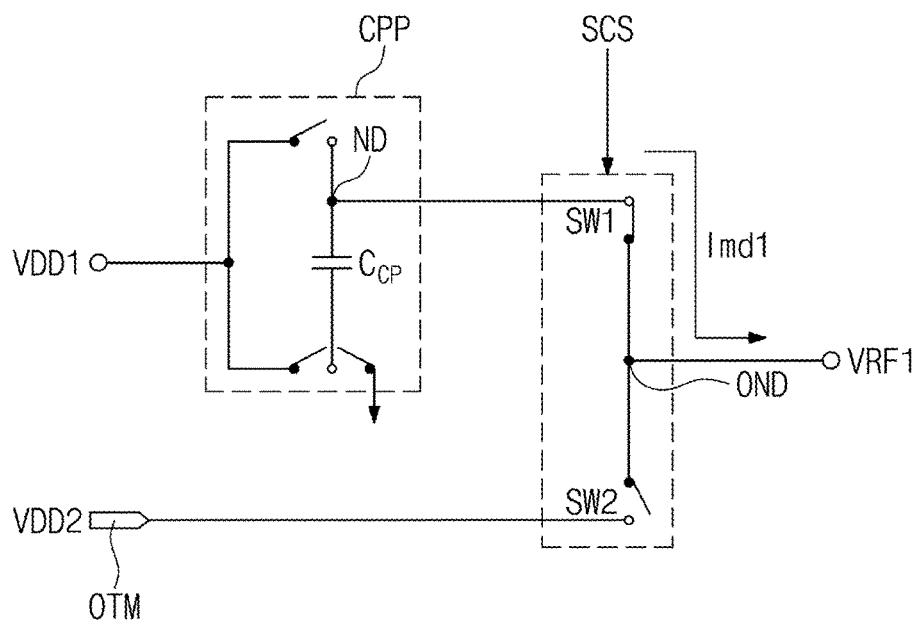
FIG. 7A is a circuit diagram illustrating a portion of a sensor driver, according to some embodiments of the present disclosure.
Figure 7B:
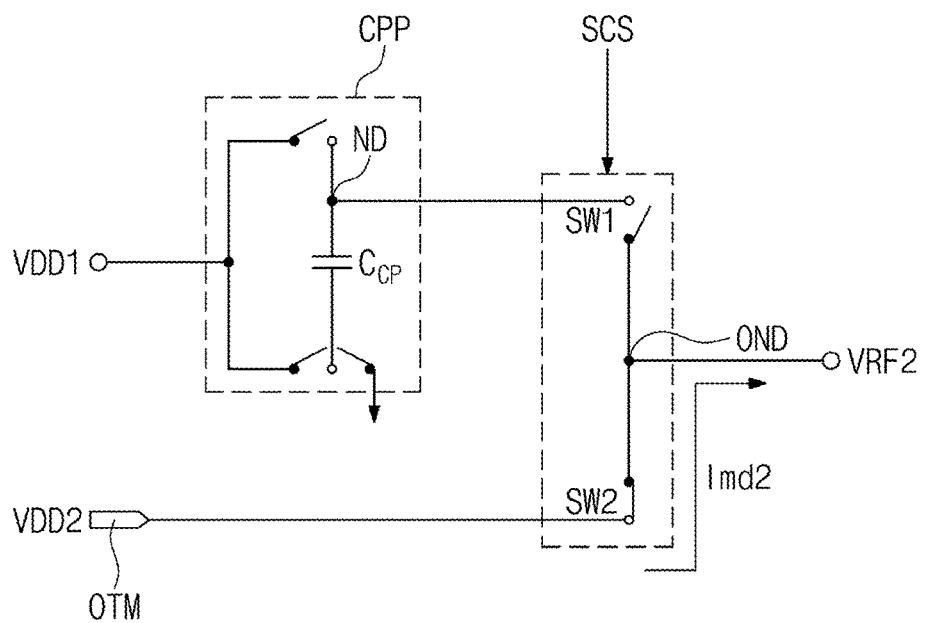
FIG. 7B is a circuit diagram illustrating a portion of a sensor driver according to some embodiments of the present disclosure.

FIG. 7A is a circuit diagram illustrating a portion of the sensor driver 2000, according to some embodiments of the present disclosure. FIG. 7B is a circuit diagram illustrating a portion of the sensor driver 2000, according to some embodiments of the present disclosure.

Referring to FIGS. 5, 7A, and 7B, a first reference voltage VRF1 may be a voltage provided to the signal generation circuit 200C2 from the inside the sensor driver 2000, and a second reference voltage VRF2 may be a voltage provided to the signal generation circuit 200C2 from the outside of the sensor driver 2000.

The sensor driver 2000 may include a charge pump CPP. A first supply current Imd1 may be provided from the charge pump CPP. The charge pump CPP may boost the power supply voltage VDD1 to output the first reference voltage VRF1. The charge pump CPP may include at least one capacitor $C_{CP}$ and three pump switches. Through the on-off operation of the three pump switches, charges are accumulated in the capacitor $C_{CP}$, and the charge pump CPP may boost the power supply voltage VDD1 to output the first reference voltage VRF1. An equivalent circuit of the charge pump CPP illustrated in FIGS. 7A and 7B is only illustrated as an example, and the equivalent circuit of the charge pump CPP is not particularly limited thereto.

The second reference voltage VRF2 may be one driving voltage VDD2 among the plurality of driving voltages provided from the power supply circuit 1000P (refer to FIG. 3) that generates the plurality of driving voltages. For example, the plurality of driving voltages may include the gate high voltage VGH (refer to FIG. 4) and the gate low voltage VGL (refer to FIG. 4), and the second reference voltage VRF2 may be the gate high voltage VGH (refer to FIG. 4).

A first switch SW1 may be connected between a node ND connected to the charge pump CPP and an output node OND. A second switch SW2 may be connected between a terminal OTM receiving a voltage from the outside of the sensor driver 2000 and the output node OND. The output node OND may be connected to the signal generation circuit 20002 to provide the first reference voltage VRF1 or the second reference voltage VRF2 to the signal generation circuit 20002. The first switch SW1 and the second switch SW2 may be included in the sensor driver 2000. However, embodiments according to the present disclosure are not limited thereto. For example, the second switch SW2 may not be included in the sensor driver 2000.

A level of the first reference voltage VRF1 may be different from that of the second reference voltage VRF2. For example, the second reference voltage VRF2 may be greater in level than the first reference voltage VRF1. Also, the intensity of a second supply current Imd2 provided from the terminal OTM may be greater than that of the first supply current Imd1 provided from the charge pump CPP.

FIG. 7A is an equivalent circuit illustrating a state in which the first reference voltage VRF1 is provided in a first mode, and FIG. 7B is an equivalent circuit illustrating a state in which the second reference voltage VRF2 is provided in a second mode. The first mode may be an operation mode when the electronic device 1000 (refer to FIG. 1) is placed in a general use environment, and the second mode is an operation mode when the electronic device 1000 (refer to FIG. 1) is placed in a noise use environment.

The general use environment may mean an environment in which noise is relatively low. The noise use environment may mean an environment in which noise is relatively high, and for example, may mean an environment when the electronic device 1000 (refer to FIG. 1) is placed in a wireless charging state. Information on the noise use environment may be stored in the main driver 1000C (refer to FIG. 3), and the main driver 1000C (refer to FIG. 3) may provide a signal for selecting whether to drive in the first mode or the second mode to the sensor driver 2000.

Figure 9:
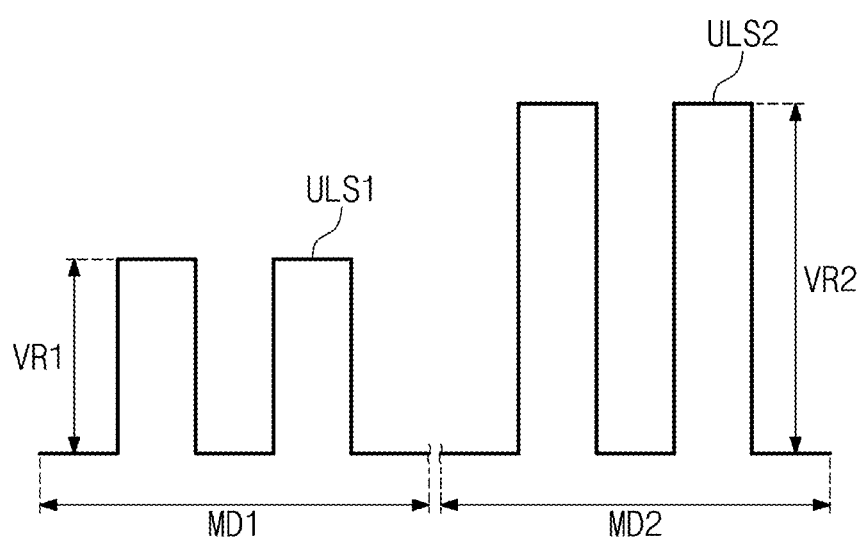
FIG. 9 is a waveform diagram illustrating an uplink signal, according to some embodiments of the present disclosure.

In the first mode, the signal generation circuit 200C2 (refer to FIG. 5) may generate a first uplink signal ULS1 (refer to FIG. 9) with the first reference voltage VRF1, and the sensor layer 200 may receive and output the first uplink signal ULS1 (refer to FIG. 9). In the second mode, the signal generation circuit 200C2 (refer to FIG. 5) may generate a second uplink signal ULS2 (refer to FIG. 9) with the second reference voltage VRF2, and the sensor layer 200 may receive and output the second uplink signal ULS2 (refer to FIG. 9).

The second uplink signal ULS2 (refer to FIG. 9) is generated by a relatively higher level of a reference voltage and a relatively larger intensity of a current than the first uplink signal ULS1 (refer to FIG. 9). Accordingly, the second uplink signal ULS2 (refer to FIG. 9) output from the sensor layer 200 may maintain a voltage (e.g., a set or predetermined voltage) or more even if the waveform is deformed due to a voltage drop or noise generated in the sensor layer 200. Accordingly, the input device 2000 (refer to FIG. 3) may receive the second uplink signal ULS2 (refer to FIG. 9) and may provide the downlink signal DLS (refer to FIG. 3) to the sensor layer 200. That is, even in a noise environment, the electronic device 1000 (refer to FIG. 1) may perform the bi-directional communication with the input device 2000 (refer to FIG. 1) through the second uplink signal ULS2 (refer to FIG. 9) and the downlink signal DLS (refer to FIG. 3). Accordingly, because a user may use the electronic device 1000 (refer to FIG. 1) and the input device 2000 (refer to FIG. 1) without restrictions on the use environment, user convenience may be improved.

The main driver 1000C (refer to FIG. 3) may determine whether or not to enter the noise environment, and may provide information on this to the sensor driver 2000. For example, the main driver 1000C may provide a switch control signal SCS for controlling operations of the first switch SW1 and the second switch SW2, respectively. In a first mode MD1 (refer to FIG. 9), the first switch SW1 may be turned on and the second switch SW2 may be turned off, and in a second mode MD2 (refer to FIG. 9), the first switch SW1 may be turned off and the second switch SW2 may be turned on.

Figure 8A:
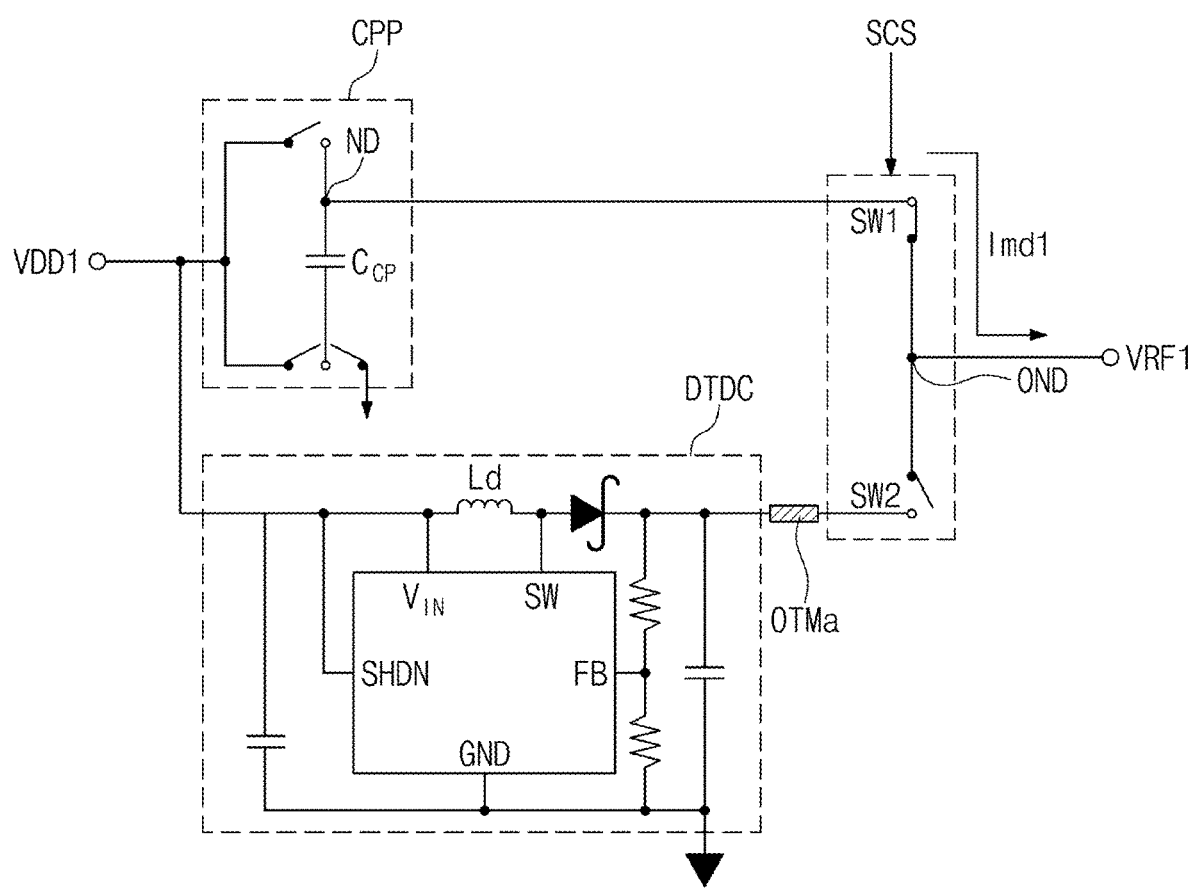
FIG. 8A is a circuit diagram illustrating a portion of a sensor driver and a DC/DC converter, according to some embodiments of the present disclosure.
Figure 8B:
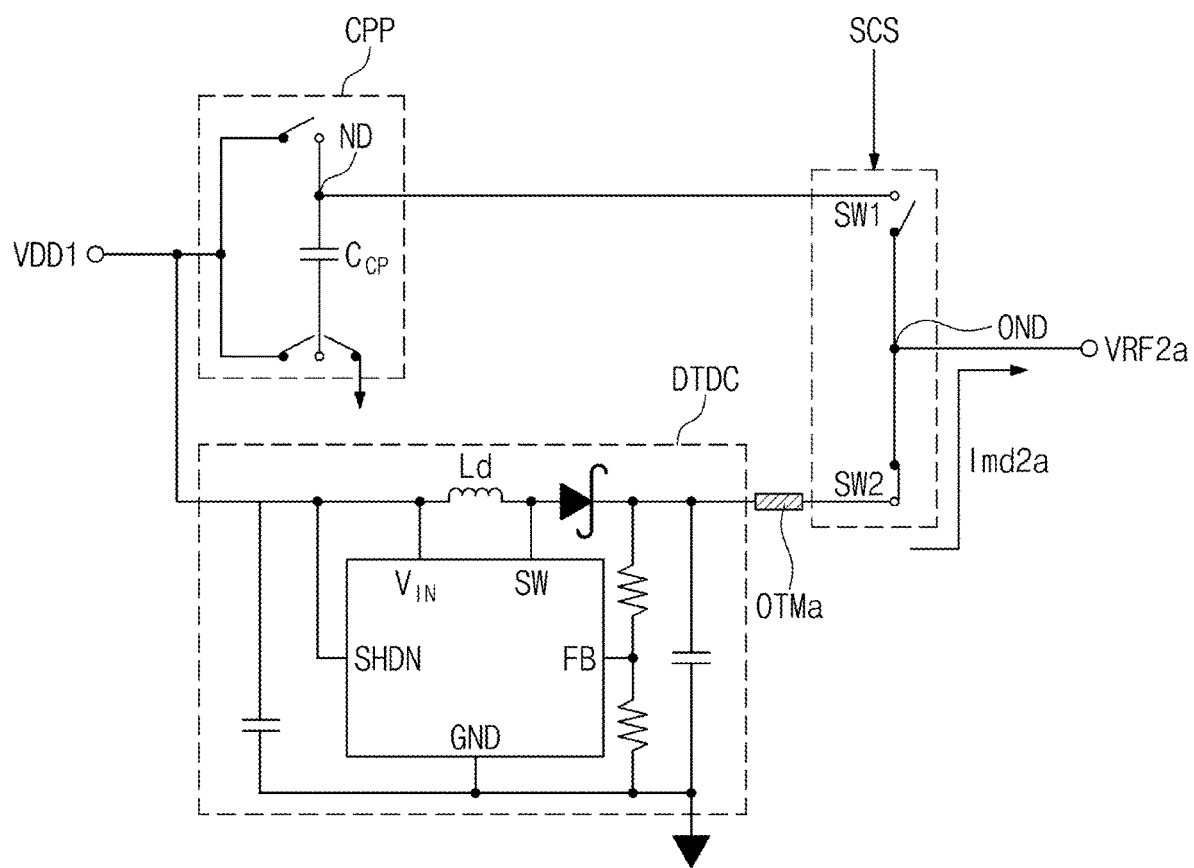
FIG. 8B is a circuit diagram illustrating a portion of a sensor driver and a DC/DC converter, according to some embodiments of the present disclosure.

FIG. 8A is a circuit diagram illustrating a portion of the sensor driver 2000 and a DC/DC converter DTDC, according to some embodiments of the present disclosure. FIG. 8B is a circuit diagram illustrating a portion of the sensor driver 2000 and the DC/DC converter DTDC, according to some embodiments of the present disclosure.

Referring to FIGS. 5, 8A, and 8B, the first reference voltage VRF1 may be a voltage provided to the signal generation circuit 20002 from the inside the sensor driver 2000, and a second reference voltage VRF2a may be a voltage provided to the signal generation circuit 20002 from the outside of the sensor driver 2000.

The charge pump CPP included in the sensor driver 2000 may provide the first reference voltage VRF1 by boosting the power supply voltage VDD1 to a level (e.g., a set or predetermined level), and the DC/DC converter DTDC may provide the second reference voltage VRF2a by boosting the power supply voltage VDD1 to a level higher than the level (e.g., a set or predetermined level).

The first switch SW1 may be connected between the node ND connected to the charge pump CPP and the output node OND, and the second switch SW2 may be connected between a terminal OTMa receiving a voltage from the outside of the sensor driver 2000 and the output node OND. The output node OND may be connected to the signal generation circuit 20002 to provide the first reference voltage VRF1 or the second reference voltage VRF2a to the signal generation circuit 200C2. The first switch SW1 and the second switch SW2 may be included in the sensor driver 2000. However, embodiments according to the present disclosure are not limited thereto. For example, the second switch SW2 may not be included in the sensor driver 2000. In this case, the terminal OTMa receiving a voltage from the outside may be located between the second switch SW2 and the output node OND.

The DC/DC converter DTDC may include an inductor Ld. Accordingly, the DC/DC converter DTDC may be capable of converting higher power than the charge pump CPP. Accordingly, the second reference voltage VRF2a boosted by the DC/DC converter DTDC may have a higher level than the first reference voltage VRF1 provided by the charge pump CPP. Also, the intensity of the second supply current Imd2a corresponding to the second reference voltage VRF2a may be greater than the intensity of the first supply current Imd1 corresponding to the first reference voltage VRF1.

When the electronic device 1000 (refer to FIG. 1) is placed in a general environment or an environment with relatively low noise, the signal generation circuit 200C2 may generate the first uplink signal ULS1 (refer to FIG. 9) with the first reference voltage VRF1, and the sensor layer 200 may output the first uplink signal ULS1 (refer to FIG. 9). When the electronic device 1000 (refer to FIG. 1) is placed in a noise environment or an environment with relatively larger noise, the signal generation circuit 200C2 may generate the second uplink signal ULS2 (refer to FIG. 9) with the second reference voltage VRF2a, and the sensor layer 200 may output the second uplink signal ULS2 (refer to FIG. 9).

According to some embodiments of the present disclosure, as the uplink signal ULS2 (refer to FIG. 9) is generated with the reference voltage provided by the DC/DC converter DTDC in a noise environment, the electronic device 1000 (refer to FIG. 1) even in a noise environment may perform the bi-directional communication with the input device 2000 (refer to FIG. 1) through the second uplink signal ULS2 (refer to FIG. 9) and the downlink signal DLS (refer to FIG. 3). Accordingly, because a user may use the electronic device 1000 (refer to FIG. 1) and the input device 2000 (refer to FIG. 1) without restrictions on the use environment, user convenience may be improved. In addition, because the DC/DC converter (DTDC) may be used only in a noise environment, the power consumption of the electronic device 1000 (refer to FIG. 1) may be minimized or reduced while relatively improving the user convenience.

FIG. 9 is a waveform diagram illustrating an uplink signal, according to some embodiments of the present disclosure.

Referring to FIGS. 7A, 7B, 8A, 8B, and 9, the first uplink signal ULS1 may be provided in the first mode MD1, and the second uplink signal ULS2 may be provided in the second mode MD2. The second reference voltage VRF2 or VRF2a of the second uplink signal ULS2 may be higher than the first reference voltage VRF1 of the first uplink signal ULS1. Accordingly, an output voltage VR2 of the second uplink signal ULS2 may be higher than an output voltage VR1 of the first uplink signal ULS1.

The first uplink signal ULS1 may be generated by the first supply current Imd1 provided from the charge pump CPP. The second uplink signal ULS2 may be generated by the second supply current Imd2 or Imd2a provided from the external terminal OTM or OTMa. The second supply current Imd2 or Imd2a may be provided from the power supply circuit 1000P (refer to FIG. 3) or may be provided from the DC/DC converter DTDC. Accordingly, the intensity of the second supply current Imd2 or Imd2a may be greater than the intensity of the first supply current Imd1.

Even though the second reference voltage VRF2 or VRF2a is set higher than the first reference voltage VRF1, the signal generation circuit 200C2 (refer to FIG. 5) receives a current from a circuit providing a relatively high current as an output in the second mode. Accordingly, even though the waveform is deformed due to a voltage drop or noise generated in the sensor layer 200, the waveform of the second uplink signal ULS2 may maintain a voltage (e.g., a set or predetermined voltage) or more. Accordingly, because a user may use the electronic device 1000 (refer to FIG. 1) and the input device 2000 (refer to FIG. 1) without restrictions on the use environment, user convenience may be improved.

According to some embodiments of the present disclosure, the second uplink signal is generated by a reference voltage having a relatively higher level than the first uplink signal and a current having a relatively greater strength than the first uplink signal. Therefore, even though the second uplink signal may be degraded by noise, an input device may receive the second uplink signal and may provide the downlink signal to the sensor layer. That is, even in a noise environment, the electronic device may perform bi-directional communication with the input device through the second uplink signal and the downlink signal. Accordingly, because the user may use the electronic device and the input device without restriction of the use environment, the user's convenience may be improved.

As described above, embodiments are disclosed in drawings and specifications. Specific terms are used herein, but are only used for the purpose of describing the present disclosure, and are not used to limit the meaning or the scope of the present disclosure described in claims. Therefore, it may be understood that various modifications and other equivalent embodiments are possible from this point one of ordinary skill in the art. The technical protection scope of the present disclosure is not limited to the detailed description of this specification, but should be defined by the technical spirit of the appended claims, and their equivalents.

What is claimed is:

1. An electronic device comprising:
   a display layer configured to display an image;
   a display driver configured to drive the display layer;
   a sensor layer on the display layer; and
   a sensor driver configured to drive the sensor layer, and
   wherein the sensor layer is configured to output a first uplink signal generated with a first reference voltage in a first mode, and to output a second uplink signal generated with a second reference voltage greater than the first reference voltage in a second mode different from the first mode,
   wherein the first reference voltage is a voltage provided by boosting a power supply voltage to a predetermined level, and
   wherein the second reference voltage is a voltage provided by boosting the power supply voltage to a level greater than the predetermined level.

2. The electronic device of claim 1, wherein the first reference voltage is a voltage provided inside the sensor driver, and
   wherein the second reference voltage is a voltage provided from outside of the sensor driver.

3. The electronic device of claim 1, further comprising:
   a power supply circuit configured to generate a plurality of driving voltages to drive the display layer, the sensor layer, the display driver, and the sensor driver, and
   wherein the second reference voltage is one of the plurality of driving voltages.

4. The electronic device of claim 3, wherein the driving voltages include a gate high voltage and a gate low voltage, and the second reference voltage is the gate high voltage.

5. The electronic device of claim 1, wherein the sensor driver further includes a charge pump, and
   wherein, in the first mode, the charge pump is configured to provide the first reference voltage boosted by the power supply voltage.

6. The electronic device of claim 5, further comprising:
   a DC/DC converter configured to provide the second reference voltage boosted by the power supply voltage.

7. The electronic device of claim 1, wherein the sensor driver includes:
   a signal generation circuit configured to provide the first uplink signal or the second uplink signal to the sensor layer;
   an input detection circuit configured to receive a sensing signal from the sensor layer; and
   a sensor control circuit configured to control operations of the signal generation circuit and the input detection circuit, and
   wherein the signal generation circuit is configured to receive the first reference voltage from the sensor control circuit and to receive the second reference voltage from outside of the sensor driver.

8. The electronic device of claim 7, further comprising:
   a first switch connected between a node configured to receive the first reference voltage and the signal generation circuit; and
   a second switch connected between a terminal configured to receive the second reference voltage and the signal generation circuit, and
   wherein, in the first mode, the first switch is configured to be turned on, and the second switch is configured to be turned off, and
   wherein, in the second mode, the first switch is configured to be turned off, and the second switch is configured to be turned on.

9. The electronic device of claim 8, further comprising:
   a main driver configured to control operations of the display driver and the sensor driver, and
   wherein the main driver is configured to output a switch control signal for controlling an operation of the first switch and an operation of the second switch.

10. An electronic device comprising:
    a display layer configured to display an image;
    a sensor layer on the display layer;
    a sensor driver electrically connected to the sensor layer and configured to be selectively driven in a first input mode for detecting a passive input or a second input mode for detecting an active input, and
    wherein, in the second input mode, the sensor layer is configured to selectively output a first uplink signal generated with a first reference voltage or a second uplink signal generated with a second reference voltage greater than the first reference voltage; and
    wherein the first reference voltage is a voltage provided by boosting a power supply voltage to a predetermined level, and
    wherein the second reference voltage is a voltage provided by boosting the power supply voltage to a level greater than the predetermined level.

11. The electronic device of claim 10, wherein the first reference voltage is a voltage provided inside the sensor driver, and
    wherein the second reference voltage is a voltage provided from outside of the sensor driver.

12. The electronic device of claim 10, further comprising:
    a power supply circuit configured to generate a plurality of driving voltages for driving the display layer and the sensor layer, and
    wherein the second reference voltage is one of the plurality of driving voltages.

13. The electronic device of claim 10, further comprising:
    a DC/DC converter configured to provide the second reference voltage.

14. An electronic device comprising:
    a display layer configured to display an image;
    a display driver configured to drive the display layer;
    a sensor layer on the display layer; and
    a sensor driver configured to drive the sensor layer,
    wherein the sensor driver includes:
    a signal generation circuit configured to selectively use a first reference voltage or a second reference voltage different from the first reference voltage to generate an uplink signal, and to provide the uplink signal to the sensor layer;
    an input detection circuit configured to receive a sensing signal from the sensor layer; and
    a sensor control circuit configured to control operations of the signal generation circuit and the input detection circuit, and wherein the signal generation circuit is configured to receive the first reference voltage from the sensor control circuit and to receive the second reference voltage from outside of the sensor driver.

15. The electronic device of claim 14, further comprising:
a power supply circuit configured to generate a plurality of driving voltages for driving the display layer and the sensor layer, and
wherein the driving voltages include a gate high voltage and a gate low voltage, and the second reference voltage is the gate high voltage.

16. The electronic device of claim 14, wherein the first reference voltage is a voltage provided by boosting a power supply voltage to a predetermined level, and
wherein the second reference voltage is a voltage provided by boosting the power supply voltage to a level greater than the predetermined level.

17. The electronic device of claim 14, further comprising:
a DC/DC converter configured to provide the second reference voltage.

18. The electronic device of claim 14, further comprising:
a first switch connected between a node configured to receive the first reference voltage and the signal generation circuit;
a second switch connected between a terminal configured to receive the second reference voltage and the signal generation circuit; and
a main driver configured to provide a switch control signal for controlling an operation of the first switch and an operation of the second switch.

* * * * *